Aug. 9, 1960      J. G. GILCHRIST      2,948,589
GRANULAR PHOSPHATE MATERIAL
Filed July 1, 1955
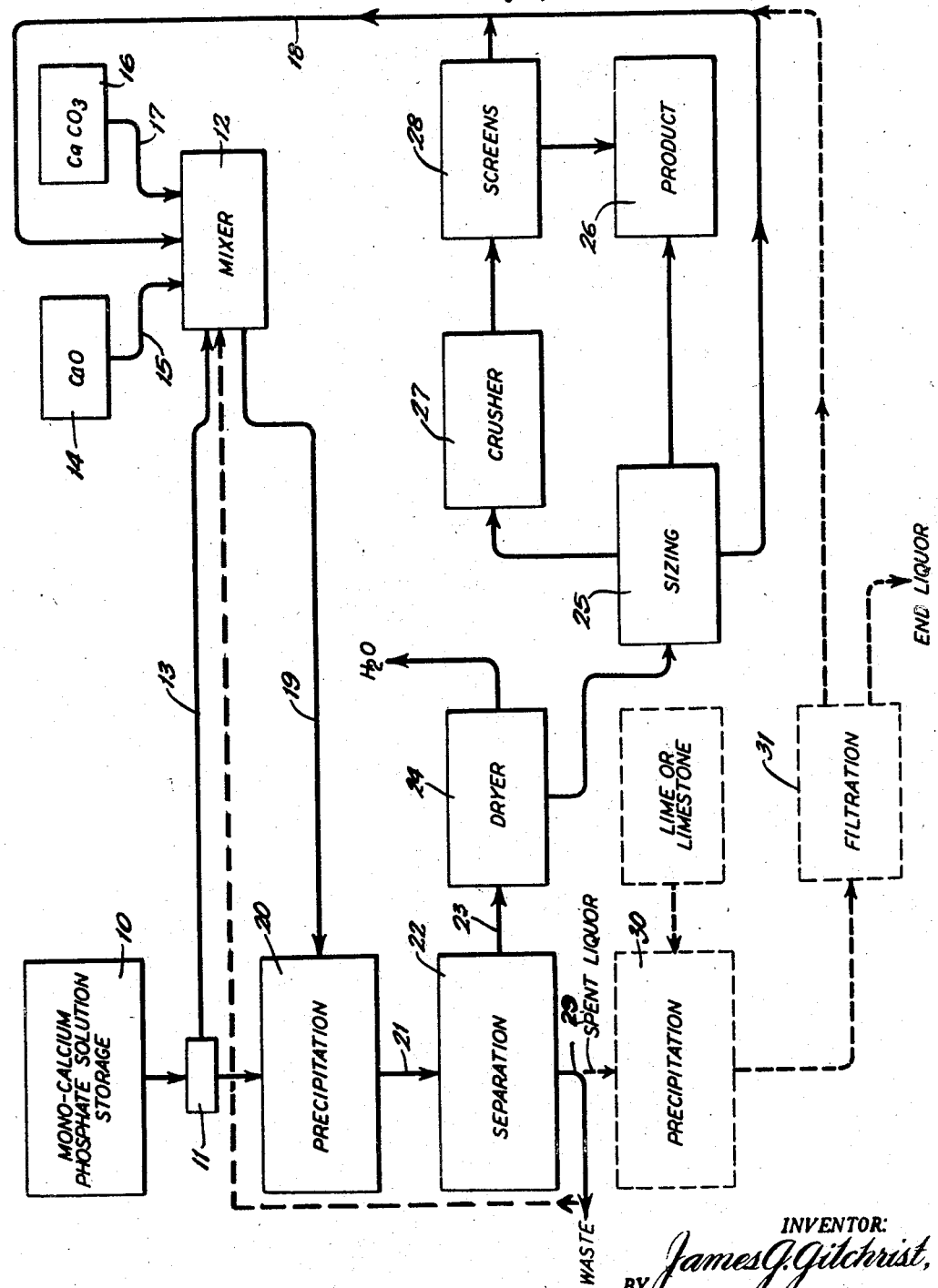
INVENTOR:
*James G. Gilchrist,*
BY
*Ernest V. Haines*
ATTORNEY.

United States Patent Office 2,948,589
Patented Aug. 9, 1960

2,948,589

GRANULAR PHOSPHATE MATERIAL

James G. Gilchrist, Bartow, Fla., assignor to International Minerals & Chemical Corporation, a corporation of New York Filed July 1, 1955, Ser. No. 519,508

6 Claims. (Cl. 23—109)

This invention relates to phosphatic materials. More particularly, it relates to a method of producing calcium phosphate. Still more particularly, it relates to a method of producing granular dicalcium phosphate by precipitation methods.

Numerous processes are known wherein phosphate rock is reacted with mineral acids and the like to produce water soluble phosphates. Aqueous solutions of these soluble phosphates with or without purification steps have been reacted with limestone or other basic reacting material to precipitate phosphates varying in composition from substantially pure dicalcium phosphate to mixtures of dicalcium phosphate with monocalcium phosphate. These processes have all encountered substantially the same difficulty. If the product is a mixture of dicalcium phosphate and monocalcium phosphate wherein the monocalcium phosphate is present in any appreciable quantity, the presence of the monocalcium phosphate makes the product objectionable in that it tends to become hygroscopic and difficult to handle. If the dicalcium phosphate is precipitated in relatively pure form, the product is predominated by small particles or crystals thus presenting a recovery problem. Further, the recovered material upon drying is made up of powdery solids, 80 to 90% of which will pass through a 325 mesh standard screen. Such a product also presents handling difficulties.

It is a primary object of this invention to overcome the disadvantages and shortcomings of processes heretofore in use.

It is another object of this invention to produce precipitated dicalcium phosphate of relatively large particle size.

It is still another object of this invention to produce precipitated dicalcium phosphate products, 70 to 80% of which will be retained on a 100 mesh size standard screen.

It is a further object of this invention to precipitate products which are easier to filter, thus lowering processing costs.

It is still a further object of this invention to provide a method whereby granular dicalcium phosphate is precipitated from monocalcium phosphate solutions by reaction with mixtures of lime and limestone.

These and other objects of the invention will be apparent to those skilled in the art from a reading of the following description.

Primarily, the method of the instant invention comprises admixing the acidic phosphorus-bearing solutions, such as substantially phosphoric acid, mixtures of phosphoric acid and monocalcium phosphate and monocalcium phosphate solution, a reactant mixture comprising lime and limestone in aqueous paste form. The reacted mixture of monocalcium phosphate solution and paste is subjected to gentle agitation and the precipitated granular dicalcium phosphate products separated from the aqueous solution and dried.

More in detail, one method of carrying out the invention is to react phosphate rock and sulfuric acid in proportions to produce a superphosphate. The superphosphate is leached with aqueous medium to recover a solution containing monocalcium phosphate, phosphoric acid, soluble reaction products of iron, aluminum, fluorine and the like.

Aqueous phosphatic solution is defluorinated by partial neutralization with lime or limestone to a pH between about 2.0 and about 4.0, preferably between about 2.5 and about 3.0. After separation of the defluorination precipitate, for example, by centrifuging or filtering, the resultant solution, which is substantially monocalcium phosphate solution, is preferably split into two portions, a very minor portion generally of the order of 5 to 15 percent by volume of the solution with the major portion being the remainder.

The minor portion of the solution is mixed with lime and limestone solids in suitable equipment such as a transverse arm cylindrical mixer or a pug mill in such amounts as to form a relatively heavy paste. Sufficient paste is added to the major portion of the solution to incorporate between about 70% and about 95% of the stoichiometric quantity of calcium necessary to precipitate dicalcium phosphate. The mixture of monocalcium solution and paste is agitated gently by suitable stirring means for a period of between about thirty minutes and about two hours, preferably between about forty-five minutes and about one hour. The mixture during this reaction time is maintained at a temperature in the range of between about 70° C. and about 100° C. Upon completion of the dicalcium phosphate precipitation, the granular dicalcium phosphate particles are filtered out and dried in suitable equipment, such as a direct fired rotary kiln, Nichols-Herreschoff multiple hearth dryer or the like.

Monocalcium phosphate solutions extracted from superphosphates generally have a $CaO/P_2O_5$ mol ratio in the range between about 0.25:1 and about 0.9:1. To this solution is added sufficient alkaline earth metal reactant mixture such as a basic inorganic oxygen containing compound of calcium to produce in the precipitating slurry a $CaO/P_2O_5$ mol ratio in the range between about 1.8:1 and about 2.2:1.

To form this alkaline earth metal reactant mixture into a paste, an aqueous medium is utilized which may be water but is preferably phosphatic aqueous extract solution, or spent mother liquor recovered during filtration of precipitated granular dicalcium phosphate, or the like. The aqueous medium is added to the dry mixture of lime, quick lime or limestone to form a paste having a solids content in the range between about 40% and about 85% by weight.

Reactant paste is made up from mixtures preferably of lime and/or limestone which vary from about 20% lime to about 60% lime based upon the total CaO content, i.e., weight ratios in the range between about 1:4 and about 6:4. 20% lime and 80% limestone based upon total CaO is the lowest ratio of lime to limestone which will produce granular dicalcium phosphate product giving retention of better than 80% of the dry product on a 100 mesh standard screen. A ratio of 10% lime and 90% limestone under identical conditions precipitates a product only about 36% of which will be retained on the 100 mesh standard screen. Mixtures giving equal proportions based upon total CaO precipitate a dicalcium phosphate product about 91½% of which will be retained on the same 100 mesh standard screen.

Monocalcium phosphate solution is heated prior to addition of paste to a temperature in the range between about 40° C. and about 100° C. to 110° C., with temperatures of between about 70° C. to about 110° C. and particularly between about 75° C. and 90° C., preferred. At the higher temperatures, more complete precipitation of $P_2O_5$ is effected. For example, using a so-called 50% lime and 50% limestone mixture based upon a total CaO, and reacting at temperatures of about 75° C. or above, the dicalcium phosphate product, will contain about 46–48% $P_2O_5$ and 40–41% CaO. At temperatures in the range of 40° C. to about 60° C., the dicalcium phosphate precipitated will contain about 40–41% $P_2O_5$ and about 40–41% CaO.

Paste is added in quantities based upon the stoichiometric total quantity of calcium present in the reaction mixture theoretically required to precipitate dicalcium phosphate. In the instant process best precipitation results are obtained when added between about 65% and about 95% of the stoichiometric equivalent amount required. When using 100% of the theoretical amount required, a product is obtained which has a $CaO/P_2O_5$ mol ratio of about 2.4:1. The precipitation of $P_2O_5$ is more complete under these circumstances, but the product has too high a $CaO/P_2O_5$ mol ratio to be substantially completely dicalcium phosphate. When adding 70% of the stoichiometrically equivalent amount of CaO, the precipitated product has a $CaO/P_2O_5$ mol ratio of about 2:1. When using a paste mixture of 50% lime and 50% limestone based upon total CaO, 90 to 95% of the theoretical amount of CaO gives optimum dicalcium phosphate precipitation conditions with recoveries of about 85% to about 90% of available $P_2O_5$ in dicalcium phosphate obtained.

After precipitation the recovered granular dicalcium phosphate product is dried at temperatures which will not convert the orthophosphates to a biologically less available form, as determined by animal feeding tests. Generally, the drying is carried out at temperatures in the range of about 100° C. to about 150° C. so as to minimize the formation of meta and pyrophosphates.

The process will be more fully understood by reference to the flow sheet, in which the numeral 10 represents defluorinated monocalcium phosphate solution storage. Monocalcium phosphate solution is delivered from storage to a proportioner 11 which diverts about 10 percent of the solution to mixer apparatus 12, such as a pug mill. In mixer 12, generally three materials and sometimes four materials are mixed to a paste. Monocalcium phosphate solution is delivered to mixer 12 through conduit 13. Lime is delivered from storage 14 by conveyor 15. Limestone is delivered from storage 16 by conveyor 17. Recycle calcium phosphate solids, such as undersized particles from a screening operation, are delivered by conveyor 18 to the mixer 12. If desired, spent mother liquor from the dicalcium phosphate precipitation step 20 is recycled to mixer 12 through line 29 coming from apparatus 22. The paste product of mixer 12 is delivered by conveyor 19 to precipitation reaction vessel 20 into which the remaining 90% of the reacting monocalcium phosphate solution is introduced. In vessel 20, materials are kept in movement, but are not more than gently agitated. After about one hour the slurry is delivered by conduit 21 to separation apparatus 22, such as a filter. Solids segregated by apparatus 22 are delivered by conveyor 23 to drying apparatus 24, such as a Nichols-Herreschoff hearth furnace. Dry product from furnace 24 is delivered to sizing apparatus 25, which may employ a series of sizing screens. Material of a particle size in the range between about 20 mesh and about 100 mesh standard screen size is delivered to the dicalcium phosphate product storage 26. Oversize material, i.e., larger than 20 mesh size, is delivered to crusher 27 and the crushed product again sized as by screening apparatus 28. Undersize material from apparatus 28 is delivered to conveyor 18 for delivery to mixer 12. Undersized material from sizing apparatus 25 is likewise delivered to mixer 12 by conveyor 18.

Spent liquor or solution separated from the solids in apparatus 22 may be delivered to waste or may be mixed with lime and the like as indicated at reaction station 30, to recover the approximately 1½% $P_2O_5$ remaining in the solution after precipitation at station 20 where conditions are such as to precipitate dicalcium phosphate. Solids are recovered from the treated spent liquor by filtration, as at station 31, and the solids delivered to conveyor 18 for recycle to the mixer or the solids can be dried to produce a food grade pure dicalcium phosphate having a phosphate to fluorine weight ratio in the range between about 200:1 and about 2,000:1, provided the monocalcium phosphate solution was subjected to a preliminary defluorination operation as a step in its manufacture.

The process is more completely set forth in the following example, which is given as illustrative of a preferred embodiment, although the invention is not to be construed as limited to the details set forth therein.

*Example*

About 60 tons per hour of Florida phosphate rock are ground to a particle size approximately 52% of which passes throuhg a 200 mesh standard screen. This rock analyzed approximately 68% bone phosphate of lime. The ground rock was mixed with about 36 tons per hour of 98% sulfuric acid added as approximately 53° Bé. aqueous solution. The extract was thoroughly agitated for about one minute after which it was discharged onto a continuous belt provided with exhaust means for gases such as sulfur dioxide, silicon tetrafluoride, and the like adjacent the point of discharge of slurry onto the belt. The belt length and its speed were such that the mix remained on the belt approximately twenty minutes. The set-up discharge from the belt was stored in a pile for about thirty days.

The stored material was the removed from storage, broken up, and sufficient water added to give a slurry of about 35% undissolved solids. The slurry was subjected to four stages of continuous countercurrent leaching and filtering, the final filtrate being a leached solution containing about 30% dissolved solids and being of approximately 32° Bé. gravity. The discarded tailings contained about 2½% of the 30% total $P_2O_5$ in the original rock. The filtrate from the leaching operation was further processed by adding approximately 4.7 tons per hour of limestone or its equivalent of calcium hydroxide, added in the form of hydrated lime or other suitable calcium oxide source material. After slurrying for approximately thirty minutes, the slurry was filtered on a drum filter to remove the precipitated solids such as calcium fluoride, aluminum phosphate, iron phosphate, as well as any unreacted limestone, together with minor amounts of dicalcium phosphate.

The filtrate from the defluorination step analyzed as follows:

|  | Percent by weight |
|---|---|
| $P_2O_5$ | 10.6 |
| Fluorine | 0.02 |
| CaO | 3.46 |
| Dissolved solids | 17.2 |
| Water | 68.72 |
| Total | 100.0 |

This defluorinated phosphatic extract was treated as follows:

About 1,000 parts by weight of the defluorinated monocalcium phosphate solution was split into two portions. The minor portion of about 100 parts by weight was delivered to a pug mill mixer. About 900 parts by weight was delivered to the precipitation reaction vessel. In the pug mill mixer, about 100 parts by weight of solution was mixed with about 27.6 parts by weight of lime, about 40 parts by weight of undersized dicalcium phosphate product and about 48.8 parts by weight of limestone, giving approximately 216 parts by weight of paste having a solids content of approximately 70% by weight. The 900 parts by weight of monocalcium phosphate solution was heated to approximately 90° C. and the paste from the pug mill added thereto with mild agitation. A reaction time of approximately one hour was given. The granular material produced by the reaction was filtered from the spent solution and the filtered material dried at a temperature of approximately 120° C. for one hour in a rotary dryer. The dry product was screened to recover a —20 mesh +100 mesh size fraction. The —20 mesh +100 mesh size particles were recovered as fine product and analyzed as follows:

|  | Percent by weight |
|---|---|
| $P_2O_5$ | 47.0 |
| CaO | 40.0 |
| Solids | 99.6 |
| Water | 0.4 |
| Percent weight of product larger than 100 mesh | 85–90 |

Having thus fully described and illustrated the character of the invention, what is desired to be secured and claimed by Letters Patent is:

1. A method of producing granular precipitated dicalcium phosphate which comprises mixing phosphate rock with sulfuric acid in proportions of 60 parts by weight of phosphate rock of 68% bone phosphate of lime content with 36 parts by weight of 98% sulfuric acid added as approximately 53° Bé. aqueous solution, aging the mixture, leaching the aged mixture with aqueous medium to produce an aqueous monocalcium phosphate solution containing fluoride impurities and approximately 30% dissolved solids, defluorinating the leached solution with limestone, removing the precipitated solids from the aqueous defluorinated monocalcium phosphate solution, adding to 900 parts by weight of said solution a paste prepared by mixing 100 parts by weight of said solution with approximately 27.6 parts by weight of lime, approximately 40 parts by weight of undersized product, and approximately 48.8 parts by weight of limestone, reacting the said aqueous defluorinated monocalcium phosphate solution and said paste for a period of approximately one hour at 90° C., filtering the solids from spent solution and drying the product at a temperature of approximately 120° C. for approximately one hour.

2. The process for the production of granular dicalcium phosphate which comprises reacting at a temperature between about 40° C. and about 110° C. a material selected from the group consisting of aqueous phosphoric acid, aqueous solutions of monocalcium phosphate, and mixtures thereof with an aqueous paste containing from about 40% to about 85% by weight of a mixture of lime and limestone, the weight ratio of lime to limestone in said paste being between about 1:4 and 6:4 based on the CaO content of said lime and limestone, said paste being utilized in an amount equal to from about 65% to about 100% of that stoichiometrically requisite to convert the phosphorus values present in said material to dicalcium phosphate, there being formed by said reaction a granular dicalcium phosphate product having a $CaO/P_2O_5$ mole ratio of from about 1.8:1 to about 2.4:1, at least about 70% by weight of said granular dicalcium phosphate product being retained on a 100 mesh screen.

3. The process of claim 2 wherein there is formed by said reaction a granular dicalcium phosphate product at least about 80% by weight of which is retained on a 100 mesh screen.

4. The process of claim 3 wherein the said paste is added to an aqueous monocalcium phosphate solution in amounts in the range between about 65% and about 95% of the stoichiometric amount required to precipitate a product having a $CaO/P_2O_5$ molar ratio in the range between about 1.8:1 and about 2:1.

5. The process of claim 3 wherein said paste is reacted with an aqueous monocalcium phosphate solution for between about 30 minutes and about 2 hours.

6. The process of claim 5 wherein the reaction between said paste and said aqueous monocalcium phosphate solution is carried out at a temperature in the range between about 70° C. and about 110° C.

References Cited in the file of this patent

UNITED STATES PATENTS

| 1,826,785 | Holz | Oct. 13, 1931 |
| 2,115,150 | Seyfried | Apr. 26, 1938 |
| 2,164,627 | Seyfried | July 4, 1939 |
| 2,287,264 | Ogburn | June 23, 1942 |
| 2,312,047 | Ogburn | Feb. 23, 1943 |
| 2,728,635 | Miller | Dec. 27, 1955 |
| 2,767,045 | McCullough | Oct. 16, 1956 |